W. WILLIAMSON.
COUNTER.
APPLICATION FILED JULY 18, 1918.

1,426,434.

Patented Aug. 22, 1922.
2 SHEETS—SHEET 1.

Inventor:
Walter Williamson
by Ralph W. Foster
Atty.

W. WILLIAMSON.
COUNTER.
APPLICATION FILED JULY 18, 1918.
1,426,434.
Patented Aug. 22, 1922.
2 SHEETS—SHEET 2.
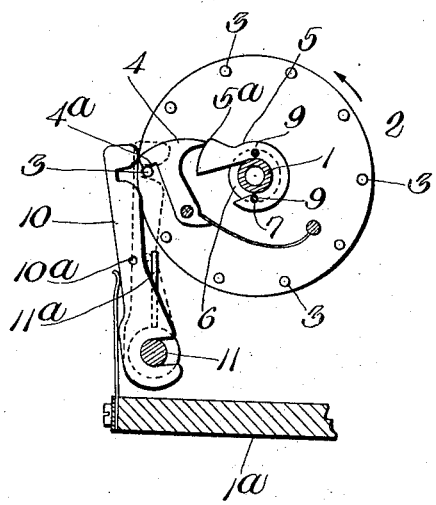
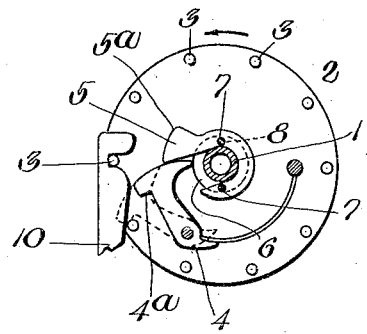
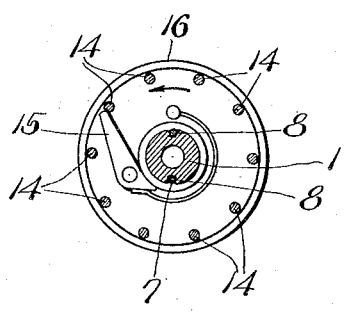
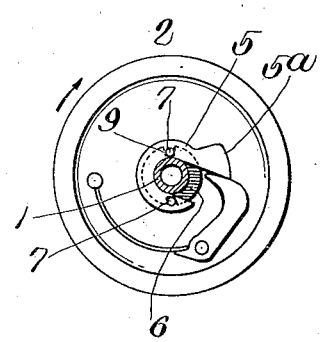
Inventor:
Walter Williamson
by Ralph W. Frost
Atty.

UNITED STATES PATENT OFFICE.

WALTER WILLIAMSON, OF NEW YORK, N. Y., ASSIGNOR TO CROSBY STEAM GAGE & VALVE COMPANY, OF BOSTON, MASSACHUSETTS, A CORPORATION OF MASSACHUSETTS.

COUNTER.

1,426,434.  Specification of Letters Patent.  Patented Aug. 22, 1922.

Application filed July 18, 1918. Serial No. 245,487.

*To all whom it may concern:*

Be it known that I, WALTER WILLIAMSON, a subject of the King of Great Britain, residing at New York, in the county of New York and State of New York, have invented certain new and useful Improvements in Counters, of which the following is a specification.

This invention relates to revolution or similar counters and particularly to the resetting means therefor and its object is to provide such means for quickly and accurately resetting the counter, or returning it to zero.

Figure 1:
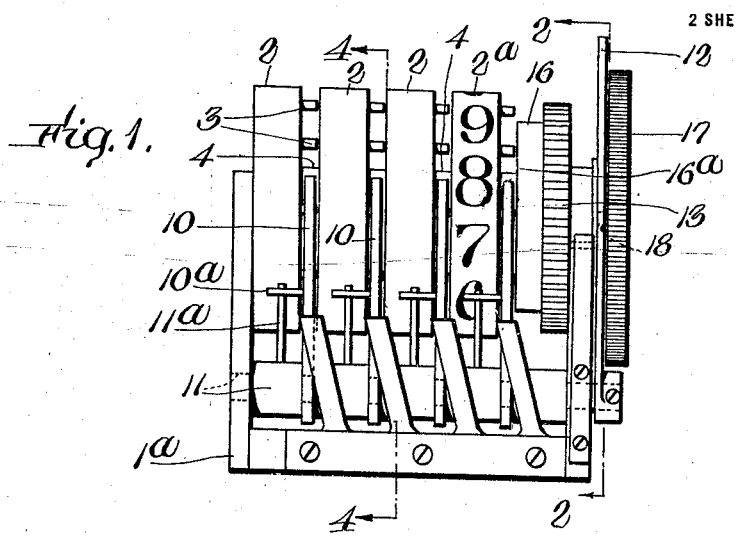
Figure 2:
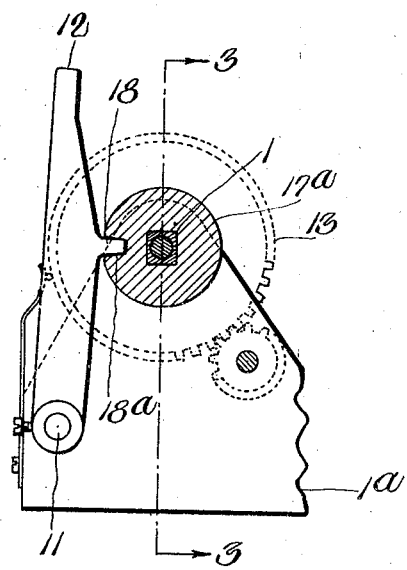
Figure 3:
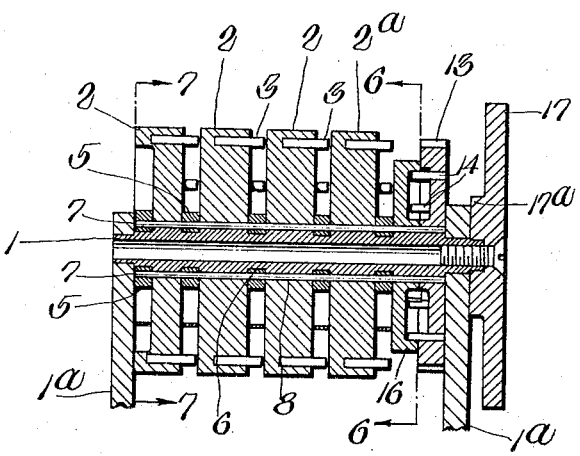

The invention is illustrated by the accompanying drawings in which:

Fig. 1 is a side elevation of the counter;
Fig. 2 is a section on the line 2—2 Fig. 1;
Fig. 3 is a section on the line 3—3 Fig. 2;
Fig. 4 is a section on the line 4—4 Fig. 1;
Fig. 5 is a view similar to Fig. 4 showing parts in resetting position;
Fig. 6 is a section on the line 6—6 Fig. 3; and
Fig. 7 is a section on the line 7—7 Fig. 3.

The device comprises a wheel shaft 1 journalled in the frame 1ª, on which shaft are rotatably mounted the wheels 2. 2ª, the wheel 2ª being the initial wheel, each of which is furnished on one side with the annularly disposed and evenly spaced studs 3 and on the other side with the spring-pressed driving pawl 4, and each of which is numbered on its face. Spacing these wheels are the cams 5 fixedly mounted on the shaft and fitting into annular grooves 6 therein and locked in said grooves by wires 7 disposed in exterior lengthwise slots 8 in the shaft and passing through holes 9 in the cams.

The spring-pressed locking pawls 10 are vibratively mounted on shaft 11 journalled in the frame and they normally severally engage studs 3 on the wheels, thereby preventing their rotation; these locking pawls are furnished with pins 10ª engaging pins 11ª on shaft 11; to the end of which shaft is fixed the spring-pressed lever 12 furnished with detent 18 adapted to engage a corresponding notch 18ª in the hub 17ª of the resetting knob 17 fixed to the end of shaft 1.

The counter is actuated by driving gear 13 rotatably mounted on shaft 1 and furnished on one side with the annularly disposed studs 14 adapted to engage the spring-pressed ratchet pawl 15 mounted on the adjacent side of disc 16 rotatably mounted on shaft 1 between said driving gear 13 and the wheel 2ª; said disc 16 being furnished on its opposite side with spring-pressed driving pawl 16ª adapted to co-act with cam 5 adjacently disposed on said shaft.

The arrangement and operation are as follows:

The wheels and cams are alternately mounted on shaft 1, the wheels rotatably and the cams fixedly, with studs 3, driving pawls 4, and cams 5 all in the same co-operative plane; driving gear 13 and disc 16 are rotatably mounted on shaft 1 in operative relation to wheel 2ª; the locking pawls 10 are severally in spring-pressed engagement with the alined wheels, thereby preventing their rotation; the spring-pressed locking lever 12 keeps shaft 1 from rotating; the parts are all in alinement and the counter is at zero, the position of the cams and pawls being as shown in Fig. 5.

When gear 13 is rotated in the direction indicated by the arrow (Fig. 6), one of the studs 14 engages ratchet pawl 15 on disc 16, thereby rotating said disc, which in turn with its driving pawl 16ª engages stud 3 on adjacent wheel 2ª and rotates it, which wheel similarly engages the adjacent wheel and so on through the series; the driving pawl in each instance traveling along the face of the cam until forced outwardly (Fig. 4) thereby engaging and forcing locking pawl 10 out of engagement with stud 3, which stud the driving pawl itself forthwith engages and carries around with it (thereby rotating the wheel) a distance determined by the contour of the cam which in the present instance is 1/10th of one revolution, or 36°; the pawl then disengages the stud and simultaneously the locking pawl 10 engages the next stud on the wheel to be similarly disengaged therefrom on the return of the driving pawl; and so the operation repeats itself from wheel to wheel, each wheel in one complete rotation rotating the adjacent wheel 36°.

It will be obvious that the relation of the driving pawls to their respective cams is the same when all the wheels are at zero, this position being attained in each instance immediately the pawl has traversed the projection 5ª (Fig. 5) on cam 5 and returned to its normally initial position; and we may at any time secure this zero position of the wheels by releasing the studs from the locking pawls, which is accomplished by means of lever 12 and pins 10ª and 11ª, and then, by turning knob 17, rotating shaft 1 and with it cams 5 which will severally engage their respective driving pawls and force them into the position shown in Fig. 5; and to accomplish this resetting of the counter, the knob 17 is turned in the direction indicated by the arrow (Fig. 6) permitting ratchet pawl 15 in disc 16 to pass studs 14 in driving gear 13, which remains undisturbed during this operation of resetting.

I claim:—

1. In a counter of the character described, in combination, a main shaft; means for rotating the shaft and means for preventing the rotation thereof, each of said means being under the control of the operator; a plurality of wheels rotatably mounted on said shaft alternately with cams fixedly mounted thereon; each wheel having on one side annularly disposed studs and on the other side a spring-controlled driving pawl; a rocking shaft disposed parallel to the main shaft; and a plurality of spring-pressed locking pawls vibratively mounted thereon and severally engaging each a stud on the oppositely disposed wheels; the driving pawls engaging and co-acting severally with the adjacent cams to successively disengage the locking pawls from the studs and themselves engage the studs and drive the wheels a predetermined distance and then release them.

2. In a counter of the character described, in combination, a main shaft; means for rotating the shaft and means for preventing the rotation thereof, each of said means being under the control of the operator; a plurality of wheels rotatably mounted on said shaft alternately with cams fixedly mounted thereon; each wheel having on one side annularly disposed studs and on the other side a spring-controlled driving pawl; a rocking shaft disposed parallel to the main shaft; and a plurality of spring-pressed locking pawls vibratively mounted thereon and severally engaging each a stud on the oppositely disposed wheels; the driving pawls engaging and co-acting severally with the adjacent cams to successively disengage the locking pawls from the studs and themselves engage the studs and drive the wheels a predetermined distance and then release them; with means for actuating the initial wheel.

In testimony whereof I have affixed my signature.

WALTER WILLIAMSON.